2,989,693
SYSTEM FOR QUANTITATIVE CALIBRATION OF EDDY CURRENT TEST EQUIPMENT
Friedrich M. O. Foerster, Grathwohlstr. 4, Reutlingen, Germany
Filed Nov. 28, 1958, Ser. No. 776,963
15 Claims. (Cl. 324—40)

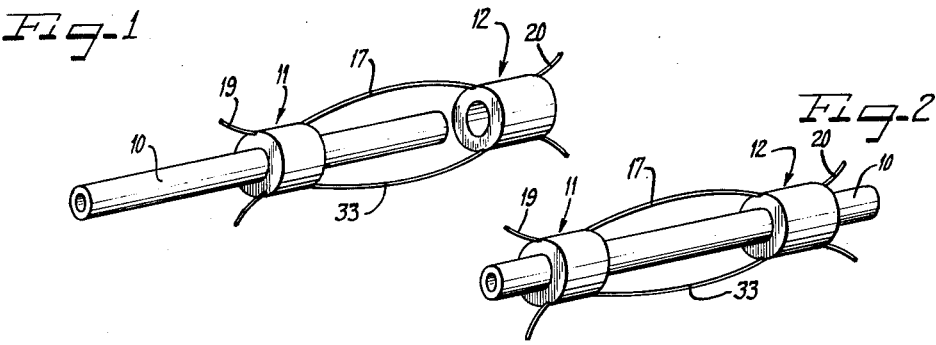
Fig-1
Fig-2
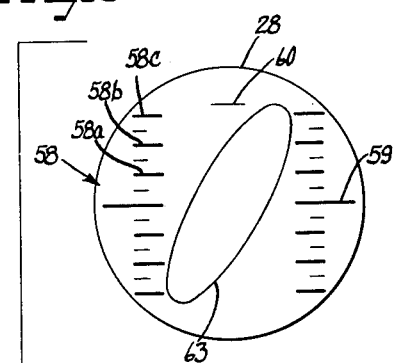
Fig-5
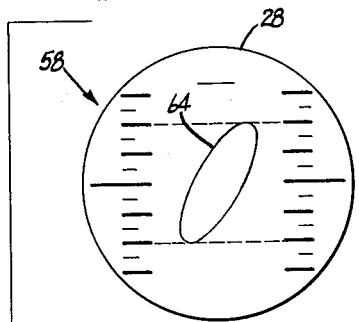
Fig-6
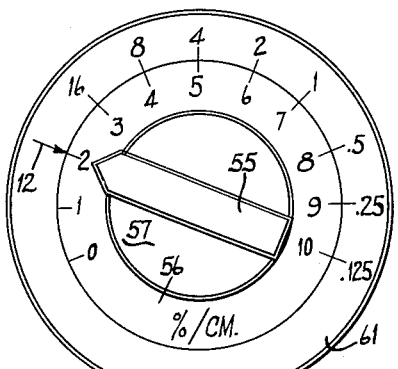
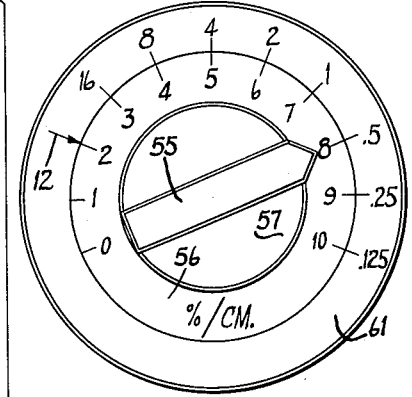
Inventor
Friedrich M. O. Foerster June 20, 1961 F. M. O. FOERSTER 2,989,693
SYSTEM FOR QUANTITATIVE CALIBRATION OF EDDY
CURRENT TEST EQUIPMENT
Filed Nov. 28, 1958 2 Sheets-Sheet 2
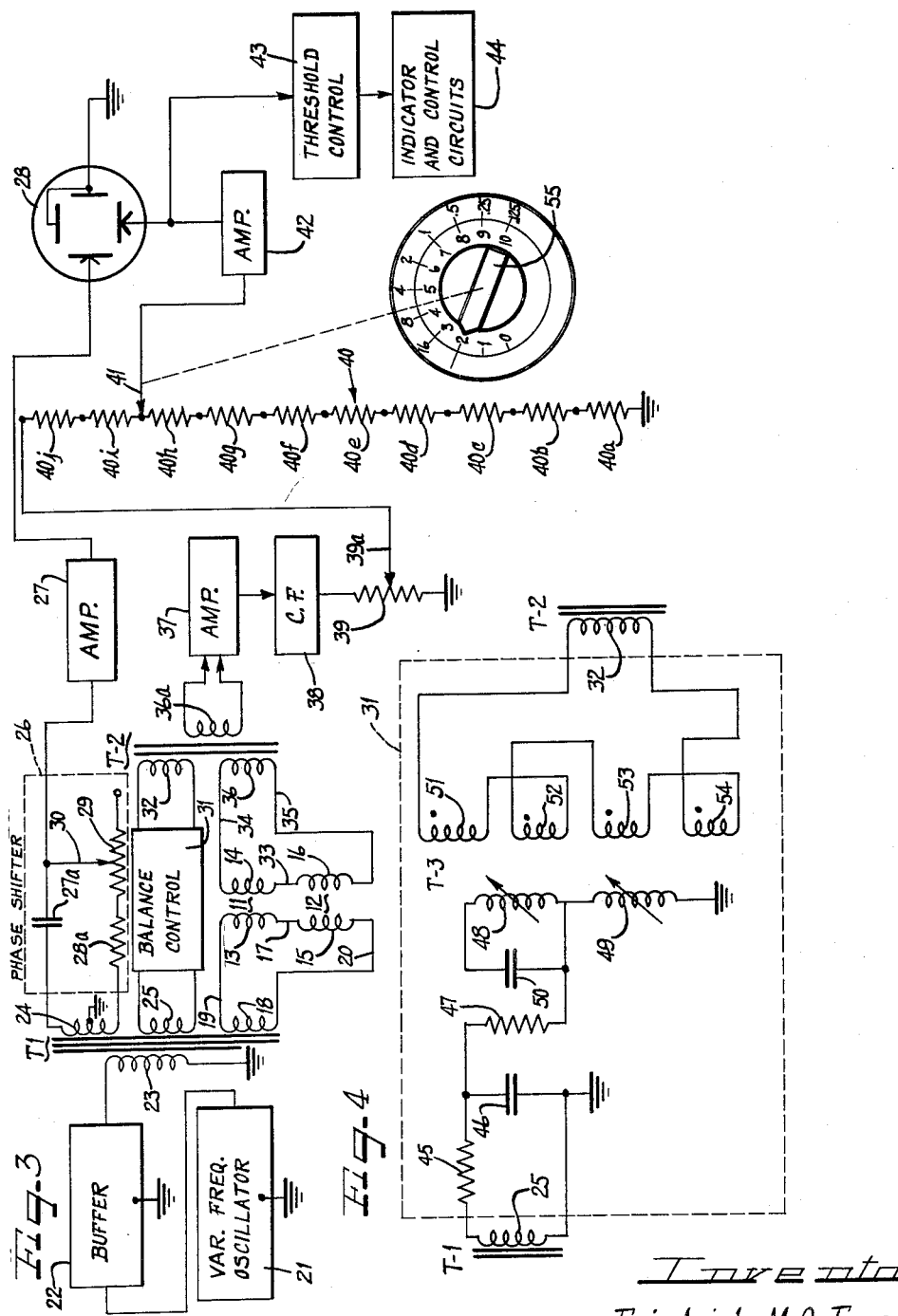
Inventor
Friedrich M.O. Foerster United States Patent Office 2,989,693
Patented June 20, 1961

This invention relates to a method and apparatus for the quantitative calibration of test equipment such as the eddy current test equipment commonly used in non-destructive testing. More particularly, this invention relates to the provision of a readily reproducible quantitative standard for calibrating such apparatus and to a "percent ring" by which the readings of such test equipment may be readily taken in terms percentages of an absolute value afforded by this standard. The invention further relates to a method and apparatus for deriving quantitative measurements of various properties of materials from such hitherto qualitative test equipment.

Known eddy current testing systems of the type to which the present invention is particularly applicable may comprise a pair of alternating current excited test coil units arranged to be placed in inductive relation to a pair of test pieces, output signals from the unit being dependent upon physical characteristics of the test pieces, such as conductivity, permeability, size, etc. Each test coil unit may comprise a single coil connected to an alternating current supply circuit with the output signal being developed across a portion of the circuit or each unit may comprise a transformer having an alternating current excited primary winding and a secondary winding in which the output signal is developed.

The output signals from the test coil units are applied in opposition to an indicating system, to obtain an indication of any difference between the test pieces, the indication being zero when the test pieces are identical. In systems of this type, the test pieces need not be physically disconnected. For example, the test pieces may be formed by spaced portions of a rod or tube, the test coil units being disposed in surrounding relation to such spaced portions.

Such eddy current testing systems are used to indicate flaws such as a crack or other non-acceptable condition in a sample under test, and this invention is concerned with establishing suitable acceptance standards by which the magnitude of a flaw may be specified.

The increase in sensitivity made possible by modern electronic circuits has magnified the problem of accurately planning such acceptance standards. The object of any acceptance standard is to establish a realistic quality level that is absolute and which is reproducible regardless of time or place at which the inspection is carried out. It should lend itself to being defined in a written specification which may be supplemented by pictures or drawings. It is useful, however, only if someone working from these written specifications can effectively and reliably reproduce the exact level of quality acceptance. The procedure should be relatively simple so that it can be effectively used by production personnel.

A good acceptance standard must of course be related directly to the function or serviceability of the product to which it is to be applied. This means that the basic knowledge for setting up an acceptance standard requires extensive testing, including such things as service testing, accelerated life test, proof testing, sectioning, metallurgical testing, hydrostatic testing, etc. All of these should be directed towards determining qualitatively and quantitatively the type of defect which will be detrimental in the particular product being tested. From this testing, a group of pedigreed samples can be selected from which an acceptance limit can be established on a specific instrument. On production products, it is usually necessary to use statistical methods to establish these acceptance limits for the pedigreed samples.

If such pedigreed samples were available for use with every test instrument, there would be no problem of acceptance standards. Unfortunately, in practice, a relatively large number of separate identical test instruments is normally used at a number of different scattered locations and it has not proven practical to attempt to provide a number of identical pedigreed samples in order to calibrate each instrument. It is a feature of this invention to provide a method of establishing secondary standards for acceptance limits which have been established by basic quality level study and which can be reproduced and used at any time and in plants at widely scattered locations since it is obviously impossible to use the same pedigreed sacples simultaneously at fifty or one hundred different locations.

In the past, three types of secondary standards have been considered. These are natural defects, electronic reference standards, and simulated defects or discontinuities.

With respect to the use of natural defects, it has not been found possible to obtain the necessary number of samples of each product all of which contain identical natural discontinuities which were exactly at the acceptance level. Furthermore, this technique has the distinct disadvantage that if, at some time in the future, it is desired to change the acceptance standard, there is then no way of doing so without getting a complete new set of samples.

It is useful for some limited purposes to build in to eddy current test equipment an electronic standard against which a discontinuity or defect can be compared or calibrated. Such a device is particularly useful for a quick check of the over-all functioning of the equipment. It is, however, very difficult to calibrate a synthetic signal so that it is accurately reproducible from instrument to instrument. There is also the problem of variations due to drift and other aging effects which effect this calibration over a period of time. A system necessary to obtain the required accuracy with this technique would be extremely complex and could be difficult to define in a simple written specification.

The use of synthetic or simulated defects is one of the most obvious and widely applied approaches to this problem of secondary standards to define an acceptance level. Such simulated defects include a wide variety of discontinuities such as slots, file marks, drilled holes, etc. These standards are very useful for some purposes but have very distinct limitations. In establishing quality limits for eddy current equipment, one is usually considering mechanical discontinuities of extremely small dimensions on the order of a few thousandths of an inch or less. It is extremely difficult to reproduce accurately physical discontinuities of this order of magnitude. While this can be done with accurate milling or drilling equipment under tool room conditions, this type of facility is not usually available in production plants. Even under laboratory conditions it has been found that there is a wide variation in samples produced by these methods due to variation in mechanical dimensions. Furthermore, almost all of the materials to which eddy current tests are normally applied are affected metallurgically by cold work. For example, on stainless steel tubing, radical changes in permeability come about due to very small amounts of cold working. This is also true of conductivity to a significant degree in other metals such as copper, aluminum, etc. This means that the type of tool used to produce this synthetic discontinuity and the way it is used has a significant effect on the signals produced in the test equipment. There is, for instance, a difference between use of a sharp or dull tool, and differences due to variation in cutting speed, application of coolant, etc. There is also the problem of handling damage to this type of reference standard since spurious signals will be produced by slight nicks or dents.

One of the principal difficulties is that many products of this type, including those considered 100% satisfactory, have significant metallurgical and dimensional variations along their length. The extremely high sensitivity eddy current equipment used in this type of testing indicates these variations and the signals produced by them are called background or noise signals. Where one is looking for extremely small defects, these background signals may have significant size relative to the minimum defect signal. Practical inspection can be carried out with a signal to noise ratio of three to one. This background noise will be present in all the material, both good and bad. Assuming that one wishes to establish a reference standard of acceptance which is approximately three times the amplitude of the background noise in a given material, the background signals can either add to or subtract from the defects signal, depending upon their relative locations. If one uses a synthetic discontinuity such as a hole or slot as a reference standard, and assuming one is striving for signal amplitude of three, the actual amplitude might come out four or two depending upon the location of the mechanical discontinuity on the part relative to the background signal. This would permit a variation in signal of up to 50% between identical mechanical discontinuities.

It is an object of this invention to provide a method and apparatus for calibrating eddy current test equipment which overcomes the above noted difficulties in previously known techniques.

It is a further object of this invention to provide a method and apparatus for calibrating test equipment by using a specimen of the part itself as a reference standard.

It is a further object of this invention to provide a simple reliable system for setting up a reference standard for test equipment which permits readily reproducible sensitivity and rejection levels to be set from instrument to instrument and which automatically compensates for electronic variations within instruments such as differences in amplification factor, aging, drift, etc.

It is a further object of this invention to provide in signal indicating means having a first scale divided into a plurality of equal divisions, a second percentage indicating scale associated with the sensitivity control of said device which second scale is calibrated to show the percentage of the signal resulting in a full scale reading on said first scale with said sensitivity control in a first position which is indicated by each division of said first scale for any position of said sensitivity control.

It is a further object of this invention to provide a method and apparatus whereby eddy current test equipment may be used for the relation and quantitative measurement of magnitudes of conductivity variation, of diameter variations, of the specific depth of a crack, or of other similar properties of a test body.

Briefly, in accordance with one aspect of the present invention, advantage is taken of the fact that in all cases where specifications are applicable, one is working with a specific size, shape, and type of part. The specifications of the part are usually carefully defined as to size, material, metallurgy, etc. Experiments show that from an eddy current instrument point of view, there is a very small percentage difference in the total signals produced by similar parts. The percent ring method takes advantage of this by using the signal derived from a specimen of the part itself as a reference. Acceptance limits may then be defined as an accurately calibrated fraction of this signal.

In the method of this invention, maximum unbalance of the system is first obtained by placing a test piece in inductive relation to only one of the test coil units, the other unit being in air out of inductive relation to any test piece. A large signal is then obtained which can be taken as a 100 percent or absolute value signal. It is then possible to determine the magnitude of a flaw-produced signal in terms of a percentage of the absolute signal, it being understood that the term "percentage" as used herein includes ratios or other values which can be related to percentage. The percentage obtained with a pedigreed sample can therefore be used to accurately define an acceptance limit. It is found that measurements by this system are completely practicable and reproducible even though the acceptance limit may be as small as one-tenth of one percent of the absolute value.

According to a specific feature of the invention, a sensitivity control device is connected to one or the other of a pair of adjustable indicators located adjacent one another, one of the indicators having a percent indicating scale and the other having a mark or pointer adapted to be aligned with indicia marks on the scale. In operation, the sensitivity of the instrument is adjusted with a test piece in inductive relation to one of the test coil units only, until a predetermined indication is obtained, which generally requires a low sensitivity value. The indicator having the scale thereon is then adjusted until a certain mark thereon is aligned with the pointer. Then with test pieces in both coil units, the sensitivity control device is adjusted to increase the sensitivity and permit determination of a flaw. The indicia of the indicator aligned with the pointer then indicates the sensitivity of the instrument, and thus the size of the flaw may be quantitatively evaluated in terms of percentage.

In a preferred arrangement, a rotatable pointer knob is connected to the sensitivity control device, and disposed behind the knob is a circular dial rotatable about the axis of the knob and having an arcuately extending scale calibrated in percentage. Only a ring-shaped portion of the circular dial is visible, hence the term "percent ring."

While the novel and distinctive features of the invention are particularly pointed out in the appended claims, a more expository treatment of the invention, in principle and in detail, together with additional objects and advantages thereof, is afforded by the following description and accompanying drawing in which like reference characters are used to refer to like parts throughout and wherein:

FIGURE 1 is a fragmentary perspective view showing a test body inserted in one pair of the two pairs of test coils for calibration of the apparatus of the present invention.

FIGURE 2 is a similar fragmentary perspective view showing the test rod positioned in both pairs of coils for testing in the normal operation of the apparatus of the present invention.

FIGURE 3 is a combined block and circuit diagram of apparatus embodying the concepts of the present invention.

FIGURE 4 is a circuit diagram of a balance control unit shown in block form in FIGURE 3.

FIGURE 5 is a fragmentary plan view showing a typical setting of the sensitivity control and percent ring to calibrate the apparatus of FIGURE 3.

FIGURE 6 is a fragmentary plan view similar to FIGURE 4 showing the manner in which the percent ring is used to interpret the test results when the specimen is positioned as shown in FIGURE 2.

Turning now to the drawings, and in particular to FIGURES 1, 2 and 3 thereof, there is shown apparatus for testing a metallic tube or rod 10 for such defects as straight and saw-tooth-like seams, overlapping or fold-covers, voids, heavy scale, indentations which may be conductive, magnetic, or non-conductive abrupt diameter variations or metallurgical variations such as work hardening or the like. The apparatus comprises a pair of test coil units 11 and 12 to be disposed in inductive relation to a pair of test pieces formed by spaced portions of the rod or tube 10. The test coil units are preferably transformers, the unit 11 having a primary 13 and a secondary 14, and the unit 12 having a primary 15 and a secondary 16. If desired, the primaries might be formed by a single continuous winding. The primary windings 13 and 15 are connected in series by a wire 17 and are supplied with alternating current excitation signal from one of the secondary windings 18 of a transformer T-1 by connecting wires 19 and 20.

The test coil units need not be transformers, nor do they need to be in surrounding relation to the test piece as is illustrated. It is also noted that the test pieces may be disconnected members, rather than separate portions of the same member.

A variable frequency oscillator 21 supplies the exciting signal through a buffer amplifier 22 to the primary winding 23 of the transformer T-1. The transformer T-1 is provided with three secondary windings including the secondary winding 18 which feeds the primary test coils 13 and 15 as noted above and which also includes secondary windings 24 and 25. The signal from the secondary winding 24 is applied through a phase shifter 26 and amplifier 27 to the horizontal deflection plates of a cathode ray tube or similar indicating device 28. The phase shifting network 26 may, for example, comprise a capacitor 27a connected to one end of the grounded center tapped winding 24 and a resistor 28a and potentiometer 29 connected to the other end of winding 24. The wiper arm 30 of potentiometer 29 is connected to the other side of capacitor 27a from which the signal is derived to be fed through amplifier 27 to the horizontal deflection plates. By varying the position of the wiper arm 30 of potentiometer 29 one may vary the phase of the signal supplied to the horizontal deflection plates. The phase shifter is preferably provided with a scale indicating the position of wiper arm 30 and hence the phase of the signal applied to the horizontal deflection plates.

The signal from secondary winding 25 of transformer T-1 is applied through balance control circuitry 31 to a primary winding 32 of a transformer T-2. The balance control circuitry 31 is shown in detail in FIGURE 4 and is essentially a phase shifting network which may be adjusted to compensate for minute manufacturing differences in the test coil assemblies 11 and 12. That is to say, it is practically impossible to manufacture two identical test coil assemblies and the balance control circuitry 31 is provided to introduce a small adjustable phase shift in an output signal to be combined with the output signal from the test coils so as to compensate for these differences.

As noted above, signal from the third secondary winding 18 of transformer T-1 is applied to the two series connected primary test coils 13 and 15 within which a tube or rod 10 under test is inserted as shown in FIGURE 2. This signal induces eddy currents in the tube 10, the magnitude of which are a function of the various above-noted properties of the tube. These eddy currents in turn induce a voltage in the differentially or opposingly connected secondary test coils 14 and 16. Test coils 14 and 16 are connected together by wire 33 and have their opposite ends connected by wires 34 and 35 respectively to a second primary winding 36 of transformer T-2. The combined outputs from primary windings 32 and 36 of transformer T-2 induces a voltage in the secondary winding 36a of this transformer which is applied through amplifier 37, cathode follower 38, potentiometer 39 in the cathode load circuit of cathode follower 38, decade attenuator 40, wiper arm 41 thereof, and amplifier 42 to the vertical deflection plates of the cathode ray tube 28. The output of amplifier 42 may also be applied to threshold control circuitry 43 and to additional indicator and control circuit 44, the nature and the functions of which are conventional in the art and will be discussed in greater detail below. The potentiometer 39 having wiper arm 39a in the cathode circuit of cathode follower 38 serves as the fine sensitivity control for cathode ray tube 28 whereas the decade attenuator 40 comprising the series connected precision resistors 40a through 40j and tap switch arm 41 serves as the coarse sensitivity control for cathode ray tube 28.

It will be apparent that if the tube 10 is homogeneous throughout its length, that is to say, if it is free of defects, the same voltage will be induced in each of secondary test coils 14 and 16 by the eddy currents induced in the different segments of tube 10. Hence, assuming that these coils themselves are identical, the signal supplied to primary winding 36 should be zero for a defect-free tube since the secondary coils 14 and 16 are differentially connected in opposition. Of course, when as shown in FIGURE 1 the tube 10 is positioned within only one of the coils such as the coil 14, an unbalanced condition will exist and signal will be coupled from primary winding 36 to secondary winding 36a of transformer T-2. Since both this signal which is to be fed to the vertical deflection plates and the signal which is to be fed through amplifier 27 to the horizontal deflection plates of cathode ray tube 28 are ultimately derived from the variable frequency oscillator 21, they will both have the same frequency and in general an ellipse will be produced by the beam of the cathode ray tube.

The balance control circuitry 31 is shown in greater detail in the circuit diagram of FIGURE 4 and comprises a network interposed between the secondary winding 25 of transformer T-1 and the primary winding 32 of transformer T-2. This network includes a resistor 45 and capacitor 46 connected in series across the secondary winding 25, the junction point of capacitor 46 and winding 25 being grounded and the junction point of capacitor 46 and resistor 45 being connected through a second resistor 47 to the midpoint of a split primary winding of transformer T-3. Each of the two halves 48 and 49 of the primary winding of transformer T-3 is variable in inductance to provide the adjustment of the circuit. A capacitor 50 is connected across the primary winding 48 whereas the end of primary winding 49 remote from the midpoint is grounded. Secondary windings 51, 52, 53 and 54 are connected in series with the phase relationships indicated by the conventional dots in FIGURE 4 and their combined output is applied to the primary winding 32 of transformer T-2. Adjustment of the inductance of primary winding 48 will be referred to as the "balance o" adjustment of the inductance of the primary winding 49 will be referred to as the "balance x" adjustment. The voltages induced in the secondary windings respectively associated with these controllable primary windings are respectively 90° out of phase. The operation and use of these adjustments will be discussed in detail below.

It will first be noted from FIGURES 3, 5 and 6 that the tap switch arm 41 of the decade attenuator 40 which serves as the coarse sensitivity control is mechanically ganged to a control knob 55 which may be mounted for rotation about a shaft protruding through the front or control panel of the housing of the instrument. A circular scale 56 is fixedly attached to the control panel 57 and surrounds the indicator of 55. Indicia numbered zero through ten are provided on scale 56 to indicate the eleven possible positions of the control arm 55 and hence of the tap switch 41 ganged thereto. It will be noted from the schematic reproduction of the face 28 of the cathode ray tube included in each of FIGURES 5 and 6 that the screen or face of this tube is provided with a linear scale 58 divided into a plurality of equal parts as shown. Conveniently each of the major divisions 58a, 58b, 58c may indicate a one centimeter deflection on the face of the scope from the central $x$ axis 59. The maximum deflection is indicated by a mark 60 which in the particular example shown would be at 3.1 centimeters.

Concentric with and surrounding both the control arm 55 and its associated scale 56 is a freely rotatable circular scale 61 which is the so-called percent ring. This scale is provided with a reference marker such as the arrow 62 and with indicia spaced an equal angular distance apart each separate mark being spaced the same angular distance apart as are the marks on the scale 56. Since, as noted above, the resistors of the decade attenuator 40 are selected to have values such that there is a two to one ratio between each position of the control arm 55 and tap switch 41, the markings on the percent ring 61 decrease by a factor of 2 going clockwise from arrow 62 for a reason which will become apparent from the discussion below. The desired ratios of two to one between different positions of the tap switch may be achieved by providing resistors wherein if resistors 40a and 40b are considered to have a value of one, then resistor 40c has a value of two, 40d four, 40e eight, 40f sixteen, 40g thirty-two, 40h sixty-four, 40i one hundred and twenty-eight, and 40j two hundred and fifty-six. It will, of course, be understood that the ratio of two to one is selected merely for purposes of convenience and that other ratios could be selected, and it will be further understood that the values given for the resistors are relative only and that their actual values would in practice be dictated by engineering and design consideration obvious to those skilled in the art.

The percent ring 61 and its associated circuitry may be used as a means of comparing the relative magnitude of the electrical signals resulting from various defects. In addition, it serves as a convenient means of standardizing two or more instruments to the same sensitivity. To determine the magnitude of a defect in percent of the absolute maximum unbalanced voltage developed in one of the two differential coils, the following procedure is used.

The first step is to insert a sample length of defect free tubing of the same diameter and material as the tubing to be inspected in both test coils as shown in FIGURE 2. With the coarse sensitivity control 55 set a maximum sensitivity corresponding to position 10 on the scale 56 whereby the switch arm 41 is positioned at the top of the decade attenuator 40 so that the full voltage developed across it is applied to amplifier 42, the instrument is balanced by adjustment of the balance $x$ and balance $o$ controls shown in FIGURE 4 with phase shifter 26 set for zero phase shift. During this balancing operation the phase shifter 26 is set to introduce zero relative phase shift. The signal appearing on the face of the cathode ray tube will normally be an ellipse. The balance $o$ control is adjusted to close this elliptical pattern on the cathode ray tube screen to a straight line. The balance $x$ control is then adjusted to rotate the straight line or corresponding major axis of the ellipse about its origin to align it with the $x$ axis. When the instrument has thus been balanced at maximum sensitivity the sample is withdrawn from attached coil.

The second step is to insert the defect-free sample length of tubing in the test coil so that it lies only under one of the coils as shown in FIGURE 1. The correct position of the sample can be determined by noting the point of maximum vertical deflection on the scope. This point may be located by slowly inserting the sample while watching the scope for maximum deflection. The coarse sensitivity control during this step has to be reduced from maximum to one of the lower number positions of the sensitivity dial 56 as shown in FIGURE 5.

The third step is to adjust the sensitivity control 55 as shown in FIGURE 5 so that the elliptical pattern 63 resulting from this unbalanced condition is within the range of the scale on the oscilloscope 28 as shown in FIGURE 5. The fine sensitivity control 39 is then adjusted so that the peak vertical deflection of the pattern 63 coincides with a full scale reading, that is, so that it reaches the top mark 60 on the scale. Generally, the coarse sensitivity control 55 will be set at a low sensitivity mark near one or two as shown in FIGURE 5 for this operation.

The fourth step is to rotate the percent ring 61 until the arrow 62 is aligned with the pointer 55 of the coarse sensitivity control. This setting is called the absolute value. Neither the percent ring 61 nor the fine sensitivity control 39 is adjusted from this point on in the testing operation.

The fifth step is to move the sample from the coil and to insert the tubing being tested completely through both coils as shown in FIGURE 2 until the defect in question is centered in one of the two differential coils such as in the coil assembly 12.

The sixth step is to increase the coarse sensitivity control 55 as shown in FIGURE 6 until the peak vertical deflection of the pattern due to the defect is approximately of the same order of magnitude as the pattern for one end of the test material in one coil. The fine sensitivity control is not touched during this step. This adjustment is illustrated by way of example only in FIGURE 6 wherein the pattern 64 is produced on the scale on the face of the oscilloscope.

As the seventh step, the defect may now be measured in terms of percent of the maximum unbalanced voltage by noting the setting of the coarse sensitivity control arm 55 with respect to the percent ring 61 and multiplying the percent per centimeter shown on the percent ring 61 by the total vertical deflection in centimeters above the center line of the screen of the oscilloscope.

By way of specific example, suppose after the test material was inserted half-way through the test coil and it was found that in order for the vertical pattern to coincide with the top or full scale mark on the oscilloscope scale that the coarse sensitivity control had to be set in position 2 as shown in FIGURE 5. The fine sensitivity control then provides for a vernier adjustment of the pattern. Now the percent ring 61 arrow 62 is likewise set to position 2 on the coarse sensitivity control. For the inspection process, the coarse sensitivity control is advanced six positions, the pointer of the knob now pointing to position 0.5 on the percent ring, the fine sensitivity control not having been touched. During inspection, a defect of unknown size provides a peak vertical deflection of two centimeters or two divisions on the oscilloscope scale. The two divisions deflection multiplied by the percent ring reading equals 1%

$$(2 \times 0.5\% = 1\%)$$

This now means that the defect provides an unbalanced voltage which is 1% of the maximum unbalanced voltage. The reason for this is clear if we note that the arrow 62 on the percent ring is at a point equivalent to 32% per centimeter on the ring and that the maximum deflection calibration point is 3.1 centimeters above the center line and is equivalent to the absolute signal. It will be noted that 32% per centimeter ×3.1 centimeters equals approximately 100% so that each centimeter mark on the oscilloscope is now equivalent to 32% of the absolute or maximum unbalanced signal. If now during the testing procedure the coarse sensitivity control is turned six steps to position 0.5% per centimeter as shown in FIGURE 6, the signal has been multiplied by 2 six times for a total multiplication factor of 64. In the new setting of the sensitivity control each centimeter deflection on the oscilloscope is equal to 32% divided by 64 or 0.5% of the absolute signal. This value is shown by the reading on the percent ring 61. That is to say, the scale on the percentage ring 61 is calibrated to show the percentage of the signal resulting in a full scale reading on the oscilloscope scale with the sensitivity control in a first or calibrating position which is indicated by each division of the oscilloscope scale for any position of the sensitivity control arm. By multiplying the reading on the percent scale by the deflection on the oscilloscope scale, one obtains a quantitative measure of the signal resulting from the defect in terms of the magnitude of that signal as a percentage of the maximum or absolute unbalanced signal resulting from a defect free specimen of the part itself.

It will of course be apparent that the percent ring scale need not in fact be a ring the circular shape merely being one convenient form of scale. Thus, if a multiposition linear slide switch were used instead of the rotary pointer arm 55, a linear scale could equally well be used. Furthermore, the factor of two to one between each division of the percent ring scale could of course be varied assuming that the ratio of the resistors forming the attenuator which constitutes the coarse sensitivity control were also correspondingly varied.

It should also be noted that the sensitivity control may be a continuously variable type, such as a specially wound potentiometer. In this case, the continuously adjustable control 39 would not be required, and also it would be possible to adjust the control until a predetermined indication is obtained, the magnitude of a flaw being then indicated directly from the position of the control.

In testing large groups of samples it is often convenient to provide a threshold control 43 and associated indicator and control circuits 44 of any conventional type well known in the art. Thus, threshold control 43 may be set to respond to any predetermined minimum magnitude of the voltage applied to the vertical deflection plates to actuate indicator circuits such as warning light and/or relay actuated reject control circuits 44. As illustrated in FIGURE 6, this minimum voltage might be that causing a 2 centimeter deflection on the scope which for this case corresponds to an acceptance standard set at a 19, defect.

To standardize two or more instruments to the same sensitivity, much the same procedure as outlined above is followed using the same or equivalent samples on all instruments. First the defect free sample of tubing is inserted. Any convenient diameter, conductivity and wall thickness may be used. The same sample or samples of equal diameter and conductivity and wall thickness must be used on all the instruments to be standardized. The instrument is then balanced at maximum sensitivity using the balance $x$ and balance $o$ controls with the phase shifter set at zero. Secondly, the sample length is inserted in the test coil such that it lies only under one of the coils. As the third step, the sensitivity control is adjusted so that the resulting pattern is within the range of the oscilloscope scale and the fine sensitivity control is adjusted so that the peak vertical deflection coincides with a full scale deflection. Next, as a fourth step, the percent ring is rotated until the arrow is aligned with the pointer on the coarse sensitivity control. This position gives the absolute value or maximum unbalanced deflection. The fifth step is to set the coarse sensitivity control to give a convenient deflection for a typical type defect on any one of the plurality of instruments to be standardized. The percent per centimeter reading on the percent ring opposite the coarse sensitivity pointer is noted for this instrument. The other instruments are then set so that the coarse sensitivity control points to the same percent per centimeter number on their percent ring. The performance of the above five steps on a number of different instruments will standardize these instruments so that all instruments have the same sensitivity for a given diameter and conductivity tubing. It is not necessary that the inside diameters of the coils on the instruments be the same. However, if a coil size is changed on one of the instruments, then that instrument must be re-standardized using the same sample as in the above steps. Two or more instruments can be standardized for the same diameter and conductivity of tubing only.

From the above procedures, it follows that one can relate all information to the absolute value, independent of the coil, the specific instrument, and the type of test body. For example, when, in electromagnetic measurement of the hardness or tensile strength of tubing, quantitative information should be given, then one can state that a hardness difference between 70,000 and 80,000, 80,000 and 90,000 and 90,000 and 100,000 p.s.i. correspond to a specific percentage of the absolute value. Thus, one can give the tensile strength variations between 80,000 and 90,000 p.s.i. directly in percent of the absolute value.

Thus, it is possible to state in advance for each sensitivity step how a variation of 80,000 and 90,000 p.s.i. tensile strength will be indicated on the screen. It is further possible to exactly compare test results with each other independent of location and time or of the particular instrument.

In addition to this possibility of comparing various measurement results in various plants with each other a considerable advantage is also obtained in that one can quantitatively state from the nature of the deflection how great the effect is which caused this deflection. For this quantitative statement of the magnitude of an effect, for example, a percent variation of the diameter, or a percent variation of the conductivity or crack depth in percent of the diameter, which causes a specific effect, the measurement of the phase angle between the voltage during insertion of a test body in the coil and the voltage which is applied to the empty coil is necessary. When a test body is inserted in the coil after balancing the instrument an ellipse will appear on the screen of the oscilloscope as noted above. By means of the phase shifter 26 this ellipse may be converted to an exact straight line. The phase angle which is required for this can be read directly on the scale of the phase shifter. From this angle one can obtain from the theoretical foundation of nondestructive testing with eddy current the so-called $f/f_g$ value, which is characterized by the following formula:

$$\frac{f}{f_g} = \frac{\alpha \times d^2 \cdot \mu rel}{5066}$$

In this equation, the term $f$ is the frequency of the test signal as determined by oscillator 21. The term $d$ is the outside diameter of the test body which is easily mechanically measured. The term $\mu rel$ is the relative permeability of the tubing. The term $f_g$ is the so-called limit frequency of the thin walled tube and is a constant which can be determined from theoretical considerations and independent experimental data as can the relative permeability as is well known to those skilled in the art. Since the frequency $f$ may be fixed for a specific test instrument, the scale of the phase shifter can also be given in terms of the product $\sigma d^2$, where $\sigma$ is the conductivity of the material. By measuring the diameter of the test body one can thus obtain directly after inserting the test body into the test coil, the absolute value of the electrical conductivity. Furthermore, one obtains quantitatively from the value of the product $\sigma d^2$, that is from the $f/f_g$ value, as a result of the available foundation of non-destructive material testing with eddy currents what effect will appear for a 1% diameter variation, or a 1% conductivity variation, or for a crack of, for example 10% at a specific $f/f_g$. This information is given in percent of the so-called absolute value. However, since the sensitivity data can also be read in percent of the absolute value, one can give quantitatively for each sensitivity step of the instrument by means of the quantitative phase meter, which is calibrated in $\sigma d^2$ values or in $f/f_g$ values, and the percent sensitivity knob, the deflection which will appear for a diameter variation or a conductivity variation of 1% or a crack of, for example, 10%. Conversely, one can conclude quantitatively from the magnitude of the indication of an effect the quantitative magnitude of the cause, since it is possible to draw a conclusion between crack, diameter, and conductivity defects because of their different phase direction.

Because of this quantitative determination of a specific conductivity variation, a specific diameter variation, or crack depth, and because of the absolute measurement of the conductivity by means of the previously described method, the eddy current method thus becomes a quantitative measurement method rather than the hitherto purely qualitative indication of effects.

While the principles of the invention have now been made clear, there will be immediately obvious to those skilled in the art many modifications in structure, arrangement, proportions, the elements and components used in the practice of the invention and otherwise, which are particularly adapted for specific environments and operating requirements without departing from those principles. The appended claims are therefore intended to cover and embrace any such modifications within the limits only of the true spirit and scope of the invention.

I claim as my invention:

1. Apparatus comprising, signal indicating means having a first scale divided into a plurality of equal divisions, control means to vary the sensitivity of said indicating means, said control means being movable between at least first and second positions corresponding to first and second values of sensitivity, a percentage indicating scale associated with said control means, said percentage scale being calibrated to show the percentage of the signal resulting in a full scale reading on said first scale with said sensitivity control in said first position which is indcated by each division of said first scale for any position of said sensitivity control means.

2. Apparatus comprising, signal indicating means having a first scale divided into a plurality of equal divisions by marks thereon, control means to vary the sensitivity of said indicating means in discrete incremental steps, said control means being movable between at least first and second positions corresponding to first and second values of sensitivity, a percentage indicating scale associated with said control means, said percentage scale being movable with respect to said control means, said percentage scale being calibrated to show the percentage of the signal resulting in a full scale reading on said first scale with said sensitivity control in said first position which is indicated by each division of said first scale for any position of said sensitivity control means.

3. In a method of measuring variations in the physical characteristics of test pieces, the steps of, inducing an eddy current in a test piece, deriving a first voltage which is a measure of the magnitude of said eddy current, adjusting the sensitivity of a measuring instrument to obtain a certain indication in response to said first voltage, inducing two separate eddy currents in a pair of test pieces, deriving second and third voltages which are respectively measures of the magnitude of said two separate eddy currents, applying the difference between said second and third voltages to said measuring instrument, and adjusting said instrument to provide a reading of said difference of voltage as a percentage of said first voltage.

4. In a method of eddy current testing of test pieces by measuring the difference voltages derived from a pair of test coils inductively coupled to a pair of test pieces, the improvement comprising the steps of measuring the maximum unbalanced voltage derived when a test piece is positioned in inductive relation to only one of said coils, adjusting the sensitivity of a measuring instrument to obtain a certain indication in response to said maximum unbalanced voltage, and adjusting said measuring instrument to measure the difference in voltage obtained with test pieces in both coils as a percentage of said maximum unbalanced voltage whereby a test piece itself is used to provide a quantitative standard for measurement of the magnitude of differences in the physical characteristics of test pieces.

5. Apparatus comprising, voltage measuring means having a first scale divided into a plurality of equal division by marks thereon, rotatable control means to vary the sensitivity of said measuring means an annular percentage indicating scale concentric with and rotatable about said rotatable control means, said percentage scale being calibrated to show the percentage of the voltage resulting in a full scale reading on said first scale with said sensitivity control in a first position which is indicated by each division of said first scale for any position of said sensitivity control means.

6. Eddy current test apparatus comprising: a pair of test coils arranged to be inductively coupled to test pieces and means differentially connecting said coils to obtain a difference voltage in response to differences in the physical characteristics of test pieces, a voltage measuring instrument, means to apply a predetermined percentage of said difference voltage to said voltage measuring instrument, a first scale on said voltage measuring means, a second scale calibrated to show the percentage of the voltage derived from only one of said coils resulting in a full scale reading on said first scale which is indicated by each division of said first scale when said predetermined percentage of said difference voltage is applied to said voltage measuring instrument.

7. Eddy current test apparatus comprising a pair of alternating current-excited test coils arranged to be inductively coupled to test pieces, means differentially connecting said coils to obtain an output signal in response to differences in the physical characteristics of test pieces a cathode ray tube having a first calibrated scale on the screen thereof and having a pair of deflection means, means to apply an alternating current signal to one of said deflection means of the same frequency as the excitation current of the test coils, calibrated means to vary the phase of said signal applied to said horizontal deflection means, an adjustable attenuator, means to apply the net output voltage of said secondary test coils to said adjustable attenuator, means to apply an output derived from said adjustable attenuator to the other of said deflection means, and a percentage scale associated with said attenuator, said percentage scale being calibrated to indicate for any position of said attenuator the percentage of a maximum unbalanced voltage derived from only one of said test coils which is indicated by each division of said scale on said cathode ray tube.

8. In eddy current test apparatus of the type comprising means to measure the voltage induced in first and second differentially and series connected test coils by eddy currents induced in a member to be tested, the improvement comprising voltage measuring means having a first scale divided into a plurality of equal divisions, control means to vary the sensitivity of said measuring means, said control means being movable between at least first and second positions corresponding to first and second values of sensitivity, a percentage indicating scale associated with said control means, said percentage scale being calibrated to show the percentage of the voltage resulting in a full scale reading on said first scale with said sensitivity control in said first position which is indicated by each division of said first scale for any position of said sensitivity control means.

9. In eddy current test apparatus of the type comprising means to measure the voltage induced in first and second differentially series connected test coils by eddy currents in a member to be tested, the improvement comprising, voltage measuring means having a first scale divided into a plurality of equal divisions by marks thereon, control means to vary the sensitivity of said indicating means in incremental steps, said control means being movable between at least first and second positions corresponding to first and second values of sensitivity, a percentage indicating scale associated with said control means, said percentage scale being movable with respect to said control means, said percentage scale being calibrated to show the percentage of the voltage resulting in a full scale reading on said first scale with said sensitivity control in said first position which is indicated by each division of said first scale for any position of said sensitivity control means.

10. In eddy current test apparatus of the type comprising a cathode ray tube having a pair of deflection means, an oscillator connected to apply an alternating current signal to one of said deflection means, means to apply an alternating current voltage derived from said oscillator to a pair of test coils, and means differentially applying output signals from the coils to the other of said deflection means, the improvements comprising, calibrated means to vary the phase of said alternating current signal applied to said one of said deflection means, a first scale on the screen of said cathode ray tube divided into a plurality of equal divisions, control means to vary the sensitivity of said cathode ray tube, said control means being movable between at laest first and second positions corresponding to first and second values of sensitivity, a percentage indicating scale associated with said control means, said percentage scale being calibrated to show the percentage of the voltage resulting in a full scale reading on said first scale with said sensitivity control in said first position which is indicated by each division of said first scale for any postion of said sensitivity control means.

11. In eddy current test apparatus of the type comprising a cathode ray tube having a pair of deflection means, an oscillator connected to apply an alternating current signal to one of said deflection means, means to apply an alternating current voltage derived from said oscillator to a pair of test coils, and means differentially applying output signals from the coils to the other of said deflection means, the improvement comprising calibrated means to vary the phase of said alternating current signal applied to said one of said deflection means, a first scale on the screen of said cathode ray tube divided into a plurality of equal divisions by marks thereon, control means to vary the sensitivity of said cathode ray tube in discrete incremental steps, said control means being movable between at least first and second positions corresponding to first and second values of sensitivity, a percentage indicating scale associated with said sensitivity control means, said percentage scale being movable with respect to said sensitivity control means, said percentage scale being calibrated to show the percentage of the voltage resulting in a full scale reading on said first scale with said sensitivity control in said first position which is indicated by each divison of sad first scale for any position of said sensitivity control means.

12. In an electrical testing system, a first adjustably movable indicator having spaced indicia marks forming a percent scale thereon, a second adjustably movable indicator adjacent said first indicator and having a pointer adapted to be aligned with marks on said scale, a sensitivity control device having input and output terminals, means connecting said device to one of said indicators, the output/input ratio of said device being changed by a certain constant factor in response to any movement of said one of said indicators by a certain amount in one direction, output indicating means connected to said output terminal, means for applying a first electrical signal to said input terminal while adjusting said indicators to obtain a certain response in said output indicating means while said pointer is aligned with a certain mark on said scale, and means for then applying a second electrical signal to said input terminal while adjusting said one of said indicators to determine the magnitude of said second signal in terms of percentage of said first signal.

13. In an electrical testing system, a first adjustably movable indicator having spaced indicia marks forming a percent scale thereon, a second adjustably movable indicator adjacent said first indicator and having a pointer adapted to be aligned with marks on said scale, a sensitivity control device having input and output terminals, means connecting said device to one of said indicators, the output/input ratio of said device being changed by a certain constant factor in response to any movement of said one of said indicators by a certain amount in one direction, output indicating means connected to said output terminal, a pair of test coils arranged to be disposed in inductive relation to test pieces, means differentially connecting said coils to obtain an output signal in response to differences in physical characteristics of test pieces disposed in inductive relation to said coils, a first output signal being obtained with a test piece in inductive relation to one of said coils only and a second output signal being obtained with test pieces in inductive relation to both coils, means for applying said first output signal to said input terminal while adjusting said indicators to obtain a certain response in said output indicating means while said pointer is aligned with a certain mark on said scale, and means for then applying said second output signal to said input terminal while adjusting said one of said indicators to determine the magnitude of said second signal in terms of percentage of said first signal.

14. In an electrical testing system, a first adjustably movable indicator having spaced indicia marks forming a percent scale thereon, a second adjustably movable indicator adjacent said first indicator and having a pointer adapted to be aligned with marks on said scale, a sensitivity control device having input and output terminals, means connecting said device to one of said indicators, the sensitivity of said device being adjustable in discrete steps with the output/input ratio of said device being changed by a certain constant factor in response to any change in one direction from one step to another, a fine sensitivity control associated with said control device, calibrated output indicating means connected to said output terminal, means for applying a first electrical signal to said input terminal while adjusting said fine sensitivity control and said indicators to obtain a certain indication in said calibrated output indicating means while said pointer is aligned with a certain mark in said scale, and means for then applying a second electrical signal to said input terminal while adjusting said one of said indicators to obtain a measurable indication in said output indicating means, the magnitude of said second signal in relation to said first signal being indicated by the position of said pointer relative to said scale taken in conjunction with the indication of said output indicating means.

15. In apparatus for measuring differences in the physical characteristics of a pair of test pieces of approximately the same size, shape and material, a pair of test coils adapted for operation in a calibrate condition in which only one coil is inductively coupled to a test piece and adapted for operation in a test condition in which both coils are inductively coupled to the test pieces, means differentially connecting said coils to obtain an output voltage therefrom, voltage measurement means for measuring said output voltage, sensitivity control means operably associated with said voltage measurement means adjustable to a low sensitivity value to produce a predetermined voltage indication on said voltage measurement means with said coils in said calibrate condition and adjustable to a higher sensitivity value with said coils in said test condition to permit detection of small differences in the physical characteristics of the test pieces, a first adjustable indicator mechanically coupled to said sensitivity control means, a second adjustable indicator adjacent said first indicator, pointer means on one of said indicators, and indicia marks on the other of said indicators including a calibrate mark alignable with said pointer means with said sensitivity control means adjusted to said low sensitivity value in said calibrate condition of said coils and including additional marks alignable with said pointer means for indicating relative sensitivity with said sensitivity control means adjusted to said higher sensitivity values.

References Cited in the file of this patent

UNITED STATES PATENTS

| | | |
|---|---|---|
| 2,434,203 | Farrow | Jan. 6, 1948 |
| 2,594,947 | Lynch | Apr. 29, 1952 |
| 2,665,333 | Dunipace et al. | Jan. 5, 1954 |